RE 25592

March 17, 1959 S. W. MOULTON 2,878,308

COLOR TELEVISION SIGNAL MODIFICATION SYSTEM

Filed Feb. 15, 1955 2 Sheets-Sheet 1

INVENTOR.
STEPHEN W. MOULTON

BY

ATTORNEY

INVENTOR.
STEPHEN W. MOULTON
BY
Ocean V. Hazeltine
ATTORNEY 2,878,308

COLOR TELEVISION SIGNAL MODIFICATION SYSTEM

Stephen W. Moulton, Hatboro, Pa., assignor to Philco Corporation, Philadelphia, Pa., a corporation of Pennsylvania Application February 15, 1955, Serial No. 488,334
8 Claims. (Cl. 178—5.4)

The invention relates to improvements in color television receiver systems which enhance the fidelity with which received color information is reproduced in visible form. More particularly the improvements which embody the invention reduce the degree of color distortion which is otherwise caused by the discrepancy between the duration of the intervals during which the image reproducing device of the receiver is capable of emitting light of any particular color and the duration of the intervals during which the color television signal represents information concerning the same color.

The kind of color television signal to which I am referring is of the form which has now been adopted as standard for this country. This signal includes a unidirectional component representative of the luminance of successively scanned portions of the televised scene, and a substantially sinusoidal, alternating component representative of the chrominance of these same portions of the televised scene. The composite signal is characterized by the fact that its amplitude is accurately representative of primary color information only during time-spaced intervals of infinitesimal duration. During the intervening intervals, which are obviously of much longer duration, this composite signal has amplitudes which do not correspond to any color information.

The kind of image reproducing device which is to be actuated by the aforedescribed signal is a cathode ray tube having a screen structure which is constituted principally of minute and closely juxtaposed elements fluorescent in different colors. These elements, while small, do have finite dimensions so that the electron beam, in scanning the screen structure of the tube, impinges upon each element for a finite length of time. If the aforedescribed composite signal is utilized directly to control the intensity of this scanning beam, then this beam will have an intensity which does not correspond to any color intelligence during the greater portion of each interval of impingement upon a light emissive screen element. This, in turn, results in the emission, from the screen structure of the tube, of light which does not correspond to any received color information.

Accordingly, it is a primary object of the invention to provide apparatus, in a color television receiver, which operates upon the received signal in such manner as to render it more suitable for controlling the electron beam intensity of a color cathode ray tube.

It is another object of the invention to provide apparatus, in a color television receiver, for enhancing the fidelity with which the receiver cathode ray tube screen structure reproduces the color intelligence represented by this signal, despite discrepancies between the durations of the intervals during which the signal represents any given color and the durations of the intervals during which the cathode ray tube is capable of reproducing this color.

To achieve the foregoing objects, as well as other which will appear, the standard color television signal is not applied directly to the receiver cathode ray tube, but instead, is subjected to certain preliminary modifications.

As has been pointed out hereinbefore, the standard signal under consideration comprises a unidirectional component which is representative of luminance information concerning successively scanned portions of a televised scene, and an alternating component which is representative of chrominance information concerning the aforementioned portions of the televised scene. In accordance with present standards this chrominance component takes the form of a subcarrier wave having a nominal frequency of approximately 3.58 megacycles, and modulated in amplitude and phase with saturation and hue information, respectively. In addition the received signal includes recurrent burst of an unmodulated alternating signal, at the nominal frequency of the chrominance subcarrier wave, and of reference phase therefor.

In accordance with my invention, the receiver for the aforedescribed signal is equipped with apparatus which is supplied with the received chrominance component and with a signal of reference phase therefor, the latter being derived from the aforementioned phase reference bursts. This apparatus is responsive to the supplied signal to produce two output signals, namely (1) a signal which bears substantially the same amplitude and phase modulation as the received chrominance component, although it need not be at the same frequency as the latter, and (2) a signal at double the nominal frequency of the first signal and bearing the same amplitude modulation as the original chrominance component. The second signal is also produced with phase variations which are of the same magnitude as the phase variations of the received chrominance component but these phase variations of the second signal are of opposite sense to those of the original chrominance component.

In other words this second signal is produced in such manner that a phase advance in the received signal occasions a phase delay in the produced signal, while a phase delay in the received signal produces a phase advance in the produced signal.

Further in accordance with my invention these two produced components are utilized, together with the luminance component of the received color television signal, to control the beam intensity of the color cathode ray tube.

As will be demonstrated hereinafter, the presence of the aforedescribed double frequency component among the components of the signal applied to the cathode ray tube, effectively causes an extension of the intervals during which the signal is substantially accurately representative of color intelligence, and, conversely, a shortening of the intervals during which the signal bears no relation to color intelligence.

In a preferred embodiment of my invention the desired double frequency component is produced by means of a modulator to which are supplied two input signals. One of these is a signal derived from the received chrominance component and bearing the amplitude and phase modulation of the latter. The other is a signal derived from the received color bursts at three times the frequency of the chrominance modulated signal and having fixed amplitude and reference phase. The modulator produces, in response to these input signals, a number of heterodyne components including the desired double frequency component. This latter component corresponds to the difference frequency heterodyne component of the two supplied signals. This component is then selectively derived from the modulator.

The manner of construction and operation of specific forms of apparatus for carrying out the aforedescribed signal modification in accordance with the invention will be more readily understood from the accompanying drawings wherein.

Figure 1:
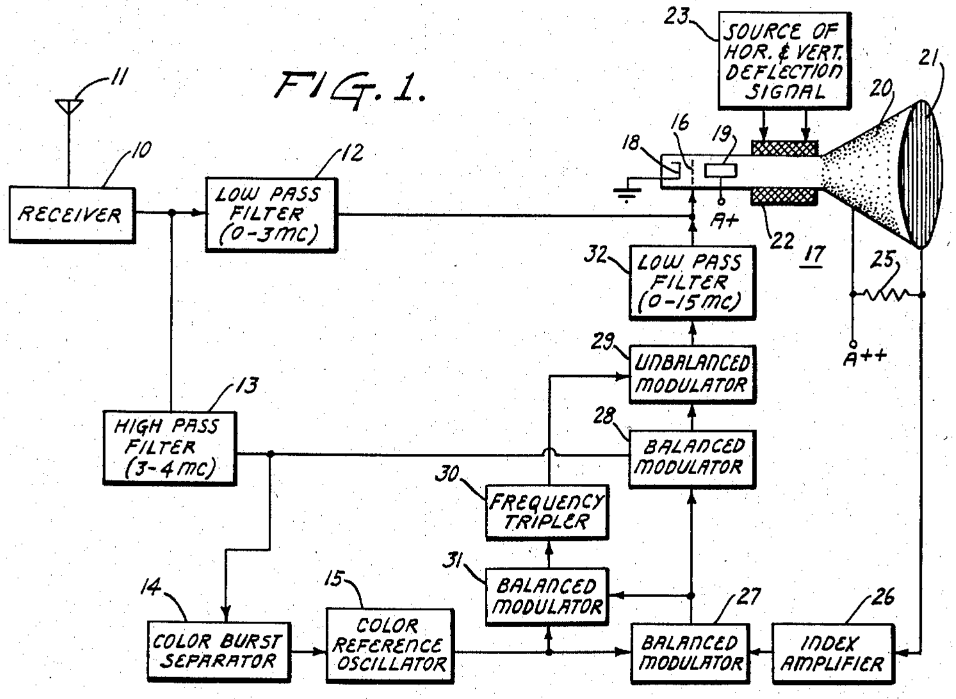
Figure 1 illustrates, in block diagram form, one form of a receiver system embodying my invention.

Referring to Figure 1 in more detail, the color television receiver system illustrated therein comprises a receiver portion 10 which is supplied with a signal intercepted by an antenna 11 and which will normally include all of those components of a color television receiver which precede the lowest frequency, or video stages thereof. In particular this receiver portion 10 may comprise a radio frequency amplifier, a heterodyne detector for converting the received radio frequency signal into an intermediate frequency signal, a number of stages of intermediate frequency amplification and a second detector for deriving a video frequency signal from the intermediate frequency signal. For the purposes of my invention all of the foregoing components may be entirely conventional and therefore need not be described in detail. As a result of the conventional operation of these components there will be available, at the output of receiver portion 10, a standard color television signal including the usual luminance and chrominance components as well as conventional scanning synchronizing pulses and color synchronizing bursts. These bursts consist of a few cycles of a sinewave having a frequency equal to the nominal frequency of the chrominance component (i. e. approximately 3.58 mc.) and bearing reference amplitude and phase relationship to the latter. These bursts are disposed on the trailing portions, or "backporches" of the blanking pulses, while, upon their leading portions, there are superimposed the usual horizontal synchronizing pulses.

In accordance with the invention the signal provided by receiver portion 10, and having the aforedescribed components, is supplied simultaneously to a low-pass filter 12 and to a bandpass filter 13. The former is conventionally constructed to transmit only signals in the 0 to 3 megacycle frequency range to the substantial exclusion of signals at all higher frequencies. Accordingly this low-pass filter 12 transmits the luminance component of the received signal but not its chrominance component. Bandpass filter 13, on the other hand, is conventionally constructed to transmit only signals in the 3 to 4 megacycle frequency range to the substantial exclusion of signals at all other frequencies. Accordingly bandpass filter 13 serves to transmit the chrominance component of the received signal but not its luminance component. This filter also transmits the aforedescribed color bursts since the frequency of these color bursts lies within its passband. These color bursts are further separated from other portions of the signal from bandpass filter 13 by means of a color burst separator 14 which may also take any conventional form. For example this color burst separator may consist of a triode vacuum tube whose grid is biased sufficiently negative to render the tube normally non-conducting. To this grid is supplied the output signal from bandpass filter 13 and also gating signals derived from the horizontal synchronizing pulses which immediately precede the color synchronizing bursts and having such amplitude and polarity as to render the triode conductive during each period of occurrence of a color synchronizing burst. However the aforedescribed form of color burst separator is purely illustrative and this separator may take any one of a number of other well known forms.

The color bursts, which are thus separated, are supplied to a color burst oscillator 15 which may be of any conventional form adjusted to operate at approximately 3.58 megacycles. The color bursts then serve to maintain this oscillator in substantial frequency and phase synchronism with themselves. As a result the color burst oscillator 15 provides a continuous output signal of reference frequency and phase for the received chrominance signal.

The luminance signal, which is available at the output of low-pass filter 12, is supplied to the beam intensity control grid 16 of a color cathode ray tube 17 which may comprise, in addition to the aforementioned beam intensity control grid 16, a conventional cathode 18, a conventional first anode 19 supplied with an appropriate unidirectional potential A+ from a suitable source of such a potential (not shown), a second anode 20, supplied with suitable unidirectional potential A++ from a suitable source of such a potential (also not shown), and a screen structure 21 which will be described in more detail hereinafter. The cathode ray tube 17 is also provided with conventional horizontal and vertical deflection coils 22 supplied with the usual horizontal and vertical deflection signals from a source of such signals, which is designated by reference numeral 23 in Fig. 1 and which may be of any conventional construction.

The aforementioned screen structure 21 is constituted of a large number of narrow, parallel strips of phosphor materials which have their longitudinal axes disposed transversely to the horizontal beam scanning direction. Different ones of these phosphor strips are constructed of materials which are responsive to electron beam impingement to emit light of different primary colors, for example, red, green and blue, respectively. Phosphor strips emissive of light of these different colors are usually disposed in regularly recurrent sequence across the screen structure; in one conventional arrangement, they occur in the order red, green, blue, following the direction of horizontal scan of the electron beam. Incidentally, it may be shown that this is also the order in which the received signal is representative of these same primary colors. The interior side of this phosphor screen structure is coated with a layer of conductive material, such as aluminum, for example, which is sufficiently thin to permit passage of the electron beam projected toward this screen structure from the cathode 18 of the tube and which reflects light emitted by the phosphors toward the interior of the cathode ray tube. On the interior surface of this aluminum film there are disposed a number of so-called "indexing" elements. These are elements which occupy a predetermined geometrical configuration relative to the phosphor strips and which are responsive to electron impingement to produce electrical indications which are distinctively different from the electrical indications produced by electron beam impingement upon other portions of the screen structure. For example, these indexing elements may take the form of strips of magnesium oxide disposed directly behind the red light emissive phosphor strips of the screen structure. Such magnesium oxide strips have a secondary electron emissivity which is substantially higher than that of the aluminum.

Accordingly, as the beam scans alternately across successive ones of these magnesium oxide strips and across the exposed aluminum layer between these strips, the number of secondary electrons emitted from the screen structure will vary. The rate at which this variation occurs will therefore indicate the rate at which the electron beam traverses successive magnesium oxide strips and also successive red light emissive phosphor strips. An indexing signal which varies at this same rate is developed, in response to these variations in secondary emission, across a resistor 25 connected between the conductive layer of the screen structure and the second anode 20. The frequency of the indexing signal which is thus derived from the screen structure represents the rate at which successive red light emissive phosphor strips are traversed by the beam, and its phase represents the time-phase position, during each period of traversal of a group of three phosphor strips by the beam, of the interval during which the beam traverses the red phosphor strip. The rate of traversal of phosphor strips by the electron beam (and consequently the frequency of the indexing signal) is dependent principally upon the rate of deflection of the beam and the number of phosphor strips occupying any given portion of the screen structure and, in particular, is independent of the rate at which color representative intervals occur in the original color signal.

In a preferred embodiment, the number of color phosphor strips constituting the screen structure is so coordinated with the rate of beam deflection across these color phosphor strips that the number of phosphor strips of any given color across which the beam sweeps during any given time interval is approximately twice as great as the number of times at which the originally received signal represents information concerning the same color, during the same time interval. The indexing signal will therefore have a frequency which is approximately twice that of the chrominance component, or approximately 7 mc. This indexing signal is amplified in an amplifier 26 which should have sufficient bandwidth to transmit not only the signal of 7 megacycle frequency but also such modulation sidebands as may be produced as a result of variations in the rate of beam scanning and/or in the uniformity of positioning of successive red phosphor strips and of the indexing elements aligned therewith.

The output signal produced by amplifier 26 is supplied to one input circuit of a balanced modulator 27, to whose other input circuit is supplied the output signal produced by color burst oscillator 15. This balanced modulator is conventionally constructed to produce a heterodyne output component at a nominal frequency equal to the sum of the nominal frequencies of the input signals, i. e. at a nominal frequency of 10.58 megacycles in the present instance, and subject to frequency and phase variations corresponding to the frequency and phase variations of the indexing signal supplied from screen structure 21 by way of amplifier 26.

This heterodyne output component of balanced modulator 27 is supplied to one input of a second balanced modulator 28, to whose other input there is supplied the separated chrominance component produced by band-pass filter 13. The balanced modulator 28 is constructed to produce a heterodyne component at a frequency equal to the difference between the frequencies of the supplied signals. This output signal is a signal of 7 megacycle nominal frequency which bears the modulation of the signal derived from the screen structure and also the phase and amplitude modulation of the received chrominance component.

The output signal thus produced by balanced modulator 28 is supplied to one input of still another modulator 29, to whose other input there is supplied an alternating signal at a nominal frequency equal to three times the nominal rate of beam traversal of successive red light emissive phosphor strips, i. e. at 21 megacycles. This second input signal to modulator 29 is derived from a frequency tripler circuit 30 supplied with a signal at a nominal frequency of 7 megacycles from a balanced modulator 31, whose two input signals are respectively derived from the output signal of balanced modulator 27 and from the output signal of color reference oscillator 15.

By reason of this manner of generating the 21 megacycle signal under consideration, the latter will be subject to frequency and phase variations in accordance with corresponding variations in the signal derived from the screen structure. However this 21 megacycle signal will be free from chrominance representative variations.

In the output circuit of modulator 29 there is connected a low-pass filter 32 constructed in conventional manner to transmit only signal components in the 0 to 15 megacycle frequency range. The output circuit of this low-pass filter 32 is connected to the control grid electrode 16 of the cathode ray tube 17, together with the output circuit of low-pass filter 12. Unlike the other modulators of the system, modulator 29, which may be of any conventional construction suitable for the purpose, is preferably unbalanced with respect to the 7 megacycle signal supplied from balanced modulator 28.

Consequently this modulator produces, at its output, not only heterodyne components of the 7 and 21 megacycle input signals, but also a replica of the supplied 7 megacycle signal. As a result, the low-pass filter 32 transmits to the cathode ray tube a signal which includes this 7 megacycle signal and which also includes a second signal, at a nominal frequency of 14 megacycles, and bearing the same chrominance representative amplitude and phase modulation as the 7 megacycle signal.

It will be noted that the 7 megacycle component of the signal which is thus supplied to the beam intensity control grid electrode 16 of cathode ray tube 17 has a nominal frequency equal to the rate at which the electron beam of this tube traverses successive ones of those phosphor strips of its screen structure which are emissive of light of a particular primary color. In addition it may be shown that the sum of this 7 megacycle and of the monochrome component supplied to the same grid 16 from low-pass filter 12, has an amplitude representative of information concerning each one of these primary colors during intervals which recur at this same 7 megacycle rate or, in other words, once during each cycle of this 7 megacycle component.

Figures 2A, 2B, 2C:
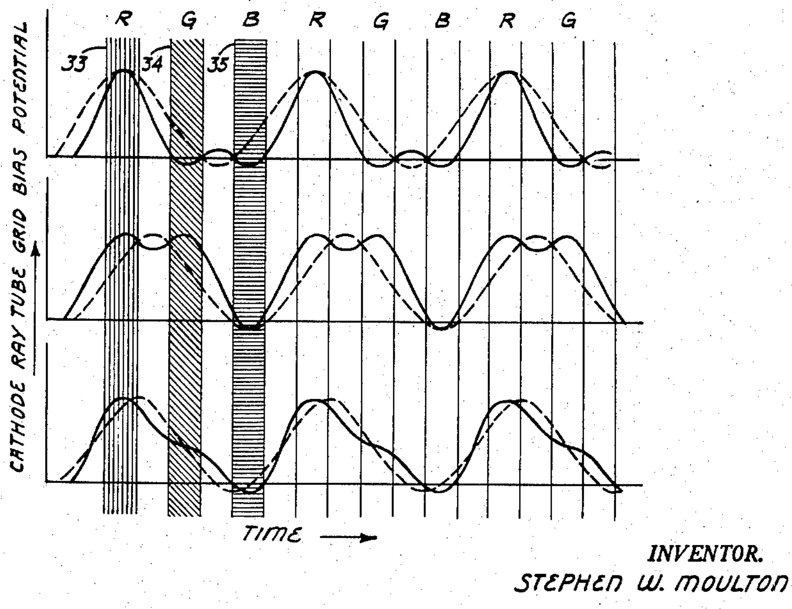
Figure 2 shows the waveforms of certain signals produced in accordance with the invention, in certain components of the system of Figure 1.

The manner in which the presence of the additional 14 megacycle component (which is also modulated with chrominance intelligence as hereinbefore described) modifies the image produced under the control of the modified composite signal will be more readily understood by a consideration of the explanatory diagrams presented in Figures 2A through 2C, to which more particular reference may now be had. In Figure 2A there is shown a broken-line curve which represents a typical video signal as it would be applied to the beam intensity control grid of the cathode ray tube if it had not been modified in accordance with my invention. This signal is seen to vary in potential (which is plotted along the ordinate axis) sinusoidally with time (which is plotted along the abscissa axis). For convenience the abscissa axis is assumed to correspond to that potential value which corresponds to the cut-off potential for the cathode ray tube beam. It will be seen that the sinusoidal curve (which represents the chrominance component of the received signal) is not centered about the abscissa axis but is centered about a line parallel to, and displaced upwardly from this axis. This displacement denotes the presence of the luminance component.

To illustrate the time-phase relationship between this received, unmodified signal and the reproduction of its color intelligence there are drawn, superposed upon the previously described portions of Figure 2A, a set of spaced, vertical strips 33, 34 and 35 whose positions along the time (abscissa) axis indicate the time intervals during which the scanning beam traverses red, green and blue light emissive phosphor strips, respectively, of the cathode ray tube screen structure, under the intensity control of the video signal illustrated. It will now be seen that the broken-line curve of Figure 2A represents a video signal which is intended to reproduce only red color information. This is apparent from the fact that this signal reaches its maximum positive excursions at the centers of the intervals of red color reproduction and is at the beam cut-off value at the centers of the green and blue light reproductive intervals.

In Figure 2A there is also shown a solid-line curve which represents the same video signal as the broken-line curve, but after it has been modified in accordance with my invention. It will be seen that this signal continues to peak at the center of the interval during which red light is reproduced but that it now has a double dip between consecutive peaks, these dips being so located in time that the signal is below the beam cut-off value during substantially the entire interval of green and blue light reproductivity. Since, in the absence of this signal modification, the signal is below cut-off only during a fraction of these latter intervals, it is apparent that, by the application of my invention, the durations of the intervals during which the received signal represents accurately the desired color intelligence have affectively been extended.

In Figure 2B there is shown, by the same mode of representation as in Figure 2A, the contrast between the operation of the receiver in the absence and in the presence of my improvement for the case in which the received signal represents a complementary color such as, for example, the color which is complementary to the primary color blue. This complementary color is produced by the emission of equal quantities of red and green light and is preferably characterized by the complete absence of any blue light. By comparing, in Figure 2B, the broken-line, which represents the received signal without modification, with the solid line which represents the signal after modification in accordance with my invention, it will be seen that the modified signal has more nearly uniform values during all intervals of red and green light productivity than the unmodified signal and that this is achieved without causing the emission of any blue light. Finally, in Figure 2C there is presented a comparison between the operation of a receiver with and without my invention for the case where it is desired to reproduce a color which is intermediate the red primary color and the blue complementary color, for which the modes of operation were illustrated in Figures 2A and 2B, respectively. Again the signal modified according to the invention is represented by a solid-line curve while the unmodified signal is represented by a broken-line curve. Again a comparison of these two curves will show that the presence of the second harmonic component, in the particular phase relationship to the fundamental component which is automatically produced by the system of Figure 1, makes the signal level more uniform during both red and green light reproductive intervals and, at the same time, reduces the signal level below cut-off during the entire duration of each blue light reproductive interval.

It will be seen from the foregoing graphical demonstration that the presence of the second harmonic component in the video signal improves the reproduction of color information by means of a screen structure of the general type under consideration for all conditions of color content, namely for primary colors, for complementary colors and for colors intermediate the primary and the complementary colors. Particular attention is invited to the fact that, under any of the foregoing conditions, the video signal modified according to the invention has approximately the desired color representative values during much longer intervals than normal.

As has been pointed out, and as is apparent from a consideration of Figures 2A through 2C, the phase relationship between the double frequency component and the chrominance component is critical for the successful operation of the receiver in accordance with the invention. As has also been pointed out it may be shown that this phase relationship will be correct automatically for all signal conditions if the triple frequency auxiliary signal, which is heterodyned with the chrominance component to produce this double frequency component, is so phased with respect to this fundamental signal that it peaks at each instant at which the composite color signal represents only one of the primary colors. It may be shown that this phase relationship between the chrominance component and the auxiliary signal is automatically produced, in the system illustrated in Figure 1, by reason of the fact that the auxiliary signal is derived by a simple frequency tripling operation from the color reference and indexing signals. Of course, if the phase relation is improper for any reason, a compensatory phase shift may be introduced, by conventional means, in the output of frequency tripler 30.

The amplitude relationship between the second harmonic component and the fundamental component under consideration, while important in determining the saturation of the reproduced image is not important for determining its hue. In view of this and in view of the fact that this relationship depends upon a number of widely variable factors (such as phosphor persistence, for example) it is preferred to leave the determination of this amplitude relationship to the designer of an actual receiver system. This relationship may, of course, be fully determined by appropriate adjustment of the amplitude of the 21 megacycle signal from frequency tripler 30 relative to that of the 7 megacycle signal from balanced mixer 28. While it is well within the skill of a worker in the art to determine this relationship for best results under any set of practical operating conditions, I have found that a double frequency component of one-half the amplitude of the fundamental chrominance component gives good results under a wide variety of operating conditions.

While the system illustrated in Figure 1 operates satisfactorily under most circumstances, it is possible to improve its operation still further by providing two separate electron beams to carry out, respectively, the functions of image formation and index signal production. To this end one of these beams is modulated in intensity with the received color signal, after its chrominance component has been modified in accordance with my invention, and the other beam is modulated with a signal at a frequency which is preferably determined independently of the video signal frequency and which is substantially higher than the upper limit of the video frequency spectrum. This improved system produces indexing indications which are less subject to contamination by the video signal than the indexing indications produced by the system of Figure 1. Consequently these indexing indications are more accurately indicative of the rate of beam traversal of successive indexing elements of the screen structure and also of the rate of traversal of successive phosphor strips emissive of light of any particular color.

Figure 3:
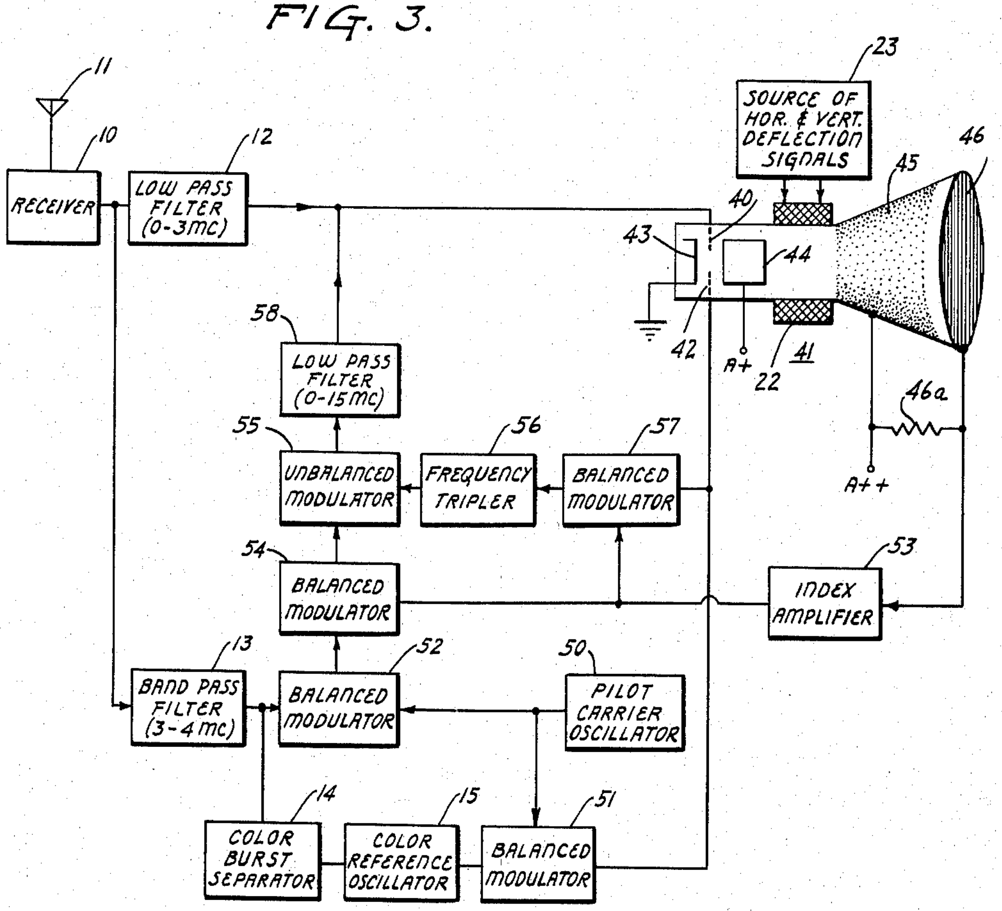
Figure 3 illustrates, also in block diagram form, a second form of receiver system which also embodies my invention.

The manner in which my inventive signal modification is carried out in this improved system is illustrated in Figure 3, to which more particular reference may now be had. The system of Figure 3 includes a number of components which are identical to components of the system of Figure 1 and these have been designated by the same reference numerals as in Figure 1. Accordingly the system of Figure 3 includes a receiver portion 10, which is supplied with a received radio frequency signal from antenna 11 and which converts this radio frequency signal into a corresponding video frequency signal. This video frequency signal is subdivided into its luminance and chrominance components by means of low-pass filter 12 and bandpass filter 13. Color burst separator 14 further separates the color bursts, which are then utilized to synchronize, in phase and in frequency, the color reference oscillator 15. The luminance component is supplied to that control grid electrode 40 of a cathode ray tube 41 which controls the intensity of one of the two electron beams produced within this tube. This cathode ray tube 41 also contains a second control grid electrode 42 which is effective to control the intensity of a second electron beam, produced separately from that beam which is under the control of grid 40. The cathode ray tube 41 is further provided with a cathode 43, which may be common to the two beams, and with a first anode 44 which is supplied with an appropriate positive potential from a conventional source of first anode potential A+ (not shown). The cathode ray tube also comprises a second anode 45, in the form of a conductive coating on the interior surface of the funnel-shaped portion of the envelope, this second anode being connected to a conventional source (not shown) of second anode potential A++. Finally the tube comprises a screen structure 46 which may be identical in every respect to the screen structure 21 of the cathode ray tube 17 of Figure 1. The screen structure is connected to the second anode by way of a load resistor 46*a* across which there is developed a varying output signal produced by variations in secondary electron emission as the electron beam scans the screen structure. The cathode ray tube 41 is also equipped with a set of conventional horizontal and vertical deflection coils 22 which may be supplied with conventional horizontal and vertical deflection signals from a conventional source 23 of such signals. The construction of the cathode ray tube 41, and particularly of its electron gun components, is such that the two beams, whose intensities are, respectively, under the control of grids 40 and 42, impinge upon closely spaced portions of the screen structure. The manner in which the electron gun of this cathode ray tube may be constructed for this purpose is described in detail in the copending applications of Wade L. Fite et al., Serial No. 307,868, filed September 4, 1952 and of Guy F. Barnett et al., Serial No. 428,744, filed May 10, 1954, both of which are assigned to the assignee of the present invention. Accordingly there is no need to recapitulate these structural details here.

As has been pointed out, the received luminance component is applied to control grid electrode 40. To the same control grid 40 there is also applied a signal which is derived from the received chrominance component in a manner which will be described hereinafter. To grid 42, on the other hand, there is applied a signal of a frequency substantially above the highest frequency component applied to grid 40. This signal is produced by means of an oscillator 50 which is conventionally constructed to operate at some elevated frequency, such as 37 megacycles, for example. The signal derived from this oscillator is heterodyned in a modulator 51 with the signal produced by the color reference oscillator 15 and the sum frequency heterodyne component produced by this modulator, namely a signal at approximately 40.58 megacycles, is supplied to control grid 42 to control beam intensity. The same oscillator output signal is also supplied to one input circuit of another modulator 52, to whose other input circuit there is supplied the received chrominance component from bandpass filter 13. The sum frequency heterodyne component produced by this modulator 52 is derived therefrom for subsequent utilization in a manner hereinafter described. This sum frequency component is also at a nominal frequency of 40.58 megacycles, but it is phase and amplitude modulated in accordance with chrominance intelligence.

When that electron beam which is under the control of grid 42, and which is therefore modulated with the 40.58 megacycle signal derived from oscillator 50 by way of modulator 51, traverses the screen structure 46 of the cathode ray tube during its normal scanning operation, there will be produced variations in secondary electron emission from this screen structure, as the beam alternately traverses magnesium oxide strips and exposed aluminum portions, at the 40.58 megacycle rate of beam intensity variation and with an amplitude which varies at the nominal 7 megacycle rate of traversal of successive indexing elements. Accordingly there will be developed, across output resistor 46*a*, a corresponding indexing signal of 40.58 megacycle nominal frequency and having upper and lower modulation sideband components which differ from this nominal frequency by 7 megacycles. These modulation sideband components are, of course, themselves subject to variations in frequency and phase due to variations in the rate at which the beam traverses successive indexing elements. One of these modulation sideband components, preferably the sum frequency component at approximately 47.58 megacycles, is derived from this output resistor by means of a sideband amplifier 53 and is supplied in turn to one input circuit of a modulator 54. To the other input circuit of this modulator there is supplied the aforementioned heterodyne component derived from modulator 52. From modulator 54 there is then derived the difference frequency heterodyne components produced by this modulator, this being a signal at a nominal frequency of 7 megacycles and modulated in amplitude and phase with chrominance information. This last-mentioned signal constitutes the fundamental component of the chrominance signal which will eventually be applied to the beam intensity control grid 40, along with the luminance component from low-pass filter 12. However, in accordance with my invention, this 7 megacycle chrominance component is not applied directly to grid 40. Instead this 7 megacycle component is supplied to one input circuit of still another modulator 55, whose second input circuit is supplied with the output signal from a frequency tripler 56, which in turn derives its input signal from a modulator 57. This modulator 57 has one input circuit supplied with the same 40.58 megacycle signal which is utilized to control the indexing beam intensity, and has its second input circuit supplied with the 47.58 megacycle signal from sideband amplifier 53. From this modulator 57 there is derived, for application to frequency tripler 56, the difference frequency heterodyne component produced by the modulator, which is a component at 7 megacycles nominal frequency and subject to frequency and phase variations in accordance with indexing information. This latter heterodyne component is then tripled in frequency in tripler 56 and is heterodyned with the 7 megacycle chrominance representative component from modulator 54 in modulator 55 as described.

Modulator 55 is conventionally constructed for unbalanced operation with respect to the signals supplied thereto from modulator 54. As a result modulator 55 produces an output signal which includes not only the heterodyne products between its two input signals but also a signal proportional to the 7 megacycle input signal from modulator 54. The output signals produced by modulator 55 are then supplied to a low-pass filter 58 which may be identical with low-pass filter 32 of Figure 1 in that it is constructed to transmit only signals in the 0 to 15 megacycle frequency range to the substantial exclusion of signals at all higher frequencies. This low-pass filter will therefore transmit not only the 7 megacycle chrominance representative signal produced by modulator 55 but also the difference frequency heterodyne component between this 7 megacycle signal and the signal of 21 megacycles nominal frequency produced by frequency tripler 56. This heterodyne component will be at a nominal frequency of 14 megacycles and will, by reason of the operation of modulator 55, also bear the amplitude and phase modulation of the original received chrominance component. Thus at the output of low-pass filter 58 there are present two signals, one at a nominal frequency equal to the rate of beam tranversal of successive phosphor elements emissive of light of a particular color and modulated with received chrominance information, and the other at a nominal frequency equal to twice that rate and also modulated with received chrominance information.

As has been previously explained, these two components are suitable for combination with the luminance component derived from low-pass filter 12 and for application to beam intensity control grid 40 to achieve the objects of my invention.

It will be seen that various additional modifications of the systems of either Figures 1 or 2 are possible without departing from my inventive concept. For example it is apparent that the various modulating operations indicated in these figures may be performed in orders different from those shown without interfering with the eventual production of the desired signal components.

It is also apparent that the double frequency signal under consideration may be produced by deriving, from the received color bursts, an unmodulated, double-frequency signal of reference phase, by deriving, from the received chrominance component, control signals respectively indicative of its amplitude and phase variations, and by utilizing these control signals, in any conventional manner, to produce the aforedescribed amplitude and phase variations in the double frequency signal.

In view of these and still other modifications which will occur to those skilled in the art I desire the scope of my invention to be limited only by the appended claims.

I claim:

1. In a color television receiver: means for producing a unidirectional signal representative of the luminance of a televised scene; means for producing a first alternating signal of predetermined nominal frequency whose amplitude and phase are subject to variations representative of the chrominance of said televised scene; means for producing a second alternating signal of said nominal frequency and of reference amplitude and phase for said first alternating signal; image reproducing means operative during time spaced intervals to emit light in different colors and responsive to applied control signals to emit said light with varying intensities; means for deriving from said image reproducing means a signal indicative of the rate of occurrence of said time-spaced intervals; means supplied with said last-named signal and with said second alternating signal and responsive thereto to produce a third alternating signal at a frequency equal to the sum of the frequencies of the signals supplied to said last-named means; means supplied with said first and third alternating signals and responsive thereto to produce a fourth signal at a nominal frequency proportional to said predetermined nominal frequency and having amplitude and phase variations proportional to those of said first signal and to produce a fifth signal, at double the nominal frequency of said fourth signal, having amplitude variations proportional to those of said first signal, and having phase variations of magnitude proportional to those of said first signal but of opposite sense; and means for applying said fourth and fifth signals and a signal derived from said unidirectional signal to said image reproducing means as control signals.

2. In a color television receiver adapted to be supplied with a composite signal including a unidirectional signal representative of the luminance of a televised scene, a first alternating signal of predetermined nominal frequency whose amplitude and phase are subject to variations representative of the chrominance of said televised scene, and a second alternating signal of said nominal frequency and of reference amplitude and phase for said first alternating signal: means supplied with said composite signal and responsive thereto to separate said first and second alternating signals from said unidirectional signal; image reproducing means operative during time spaced intervals to emit light in different colors and responsive to applied control signals to emit said light with varying intensities; means for deriving from said image reproducing means a signal indicative of the rate of occurrence of said time spaced intervals; means supplied with said last-named signal and with said second alternating signal and responsive thereto to produce a third alternating signal at a frequency equal to the sum of the frequencies of the signals supplied to said last-named means; means supplied with said second and third alternating signals and responsive thereto to produce a fourth signal at a frequency equal to the difference between the frequencies of the signals supplied to said last-named means; means for deriving from said fourth signal a fifth alternating signal at three times the frequency of said fourth signal; means supplied with said first and third signals and responsive thereto to produce a sixth signal at a nominal frequency equal to the difference between the frequencies of said first and third signals and having amplitude and phase variations proportional to those of said first signal; means supplied with said fifth and sixth signals and responsive thereto to produce a seventh signal having a first component substantially identical to said sixth signal and a second component at a nominal frequency equal to the difference between said fifth and sixth signals, said second component having amplitude variations proportional to those of said sixth signal and phase variations of magnitude proportional to those of said sixth signal but of opposite sense; and means for applying said seventh signal and a signal derived from said unidirectional signal to said image reproducing means as control signals.

3. The apparatus of claim 2 further characterized in that said image reproducing means is a cathode ray tube having a screen structure comprising a plurality of substantially parallel phosphor strips, different ones of which are emissive of light in different colors in response to electron beam impingement, strips emissive of light in said different colors being disposed in recurrent sequence across said screen structure.

4. The apparatus of claim 3 further characterized in that said means for deriving a signal indicative of the rate of occurrence of light emissive intervals includes a plurality of strips of material having secondary electron emission characteristics in response to electron beam impingement which are substantially different from those of other portions of said screen structure, said strips being disposed on the electron beam confronting surface of said screen structure in predetermined geometrical relationship to said phosphor strips.

5. The apparatus of claim 3 further characterized in that said cathode ray tube comprises an electron emissive cathode and an intensity control grid electrode for the electrons emitted by said cathode, and in that said control signals are applied to said cathode ray tube between said cathode and said control grid electrode.

6. In a color television system in which the image is reproduced by means of a cathode ray tube having a fluorescent screen structure composed of elements emissive of light in three different primary colors which are scanned by the electron beam of said tube in recurrent succession: means for producing a first alternating signal of predetermined nominal frequency and having time-spaced portions representative of information about said different primary colors, the portions of said signal which represent said different colors occurring in the same order as that in which correspondingly color emissive screen elements are scanned by said beam; means for producing a second alternating signal, of three times said nominal frequency and of reference amplitude and phase for said first alternating signal; means for heterodyning said first and second alternating signals; and means for utilizing those signals produced by said heterodyning means at frequencies equal to the difference between the frequencies of said first and second signals in controlling the intensity of said scanning electron beam.

7. The system of claim 6 further characterized in that said heterodyning means is a modulator which is unbalanced for said first alternating signal, whereby there is reproduced in the output of said heterodyning means a signal component corresponding to said first alternating signal, and further comprising means for utilizing said reproduced signal in controlling the intensity of said electron beam.

8. The system of claim 6 further characterized in that said means for producing said second alternating signal comprises means for producing a third alternating signal at the nominal frequency of said first signal and of reference amplitude and phase for said first signal, and means for tripling the frequency of said third signal.

References Cited in the file of this patent

UNITED STATES PATENTS

| | | |
|---|---|---|
| 2,681,381 | Creamer | June 14, 1954 |
| 2,745,899 | Maher | May 15, 1956 |
| 2,759,993 | Loughlin | Aug. 21, 1956 |